2,782,189
MONOAZO DYESTUFFS

Ernst Merian, Allschwil, Switzerland, assignor, by mesne assignments, to Saul & Co., Newark, N. J., as nominee of Fidelity Union Trust Company No Drawing. Application September 5, 1952, Serial No. 308,143

Claims priority, application Switzerland September 7, 1951

5 Claims. (Cl. 260—207.5)

The present invention relates to monoazo dyestuffs which dye acetate silk fibers, polyamide fibers and polyester fibers in orange to red shades, and the dyeings of which are distinguished by excellent fastness to light, washing and sublimation and, additionally, are stable with respect to so-called "gas fumes."

The monoazo dyestuffs of the present invention correspond to the formula

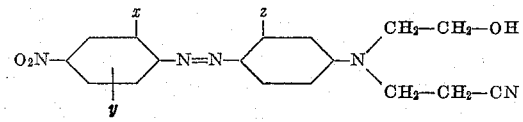

wherein $x$ stands for H, Cl or Br, $y$ stands for H, Cl, Br, methyl or methoxy, and $z$ stands for Cl or Br.

The said monoazo dyestuffs can be prepared by coupling one mol of the diazo compound of an amine of the formula

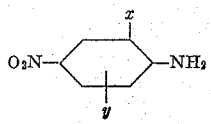

wherein $x$ and $y$ have the aforesaid significances, with one mol of a tertiary amine of the formula

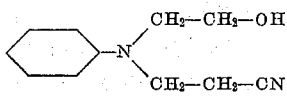

wherein $z$ has the previously-indicated significance.

A primary object of the present invention is the improvement of the fastness properties of acetate dyes comprising an azo component of the aforementioned type. This is accomplished according to the present invention by the introduction of a halogen atom into the nucleus of the aforesaid tertiary amines whereby the resultant monoazo dyestuffs are characterized inter alia by a multiple-fold improvement in fastness to gas fumes. This substitution of the azo component is, in this connection, of decisive importance; substitution of the diazo component by halogen has no influence on fastness to gas fumes. By halogen atoms, in the sense of the present invention, are meant chlorine or bromine atoms, by water-solubilizing groups the —SO₃H and —COOH groups.

As diazo components for the dyestuffs of the present invention, use may be made of the most diverse diazotizable aromatic amines, which are free of water-solubilizing groups, for example, nitro-aminobenzenes, nitro - amino - methylbenzenes, nitro - amino - methoxy-benzenes, nitro - amino - chlorobenzenes, nitro - amino-bromobenzenes, nitro - amino - dichlorobenzenes, nitro-amino-dibromobenzenes, etc.

The following examples illustrate the invention without, however, being restrictive thereof. In the said examples, the parts and percentages are by weight, and the temperatures are in degrees centigrade.

Example 1

14 parts of 4-nitro-1-aminobenzene are stirred into 150 parts of water and 27 parts of concentrated hydrochloric acid whereupon, after the addition of 90 parts of ice, diazotization is effected with 7 parts of sodium nitrite dissolved in 25 parts of water. 23 parts of 1- (N-cyanoethyl-N-hydroxyethyl)-amino-3-chlorobenzene are then stirred into 250 parts of water and 15 parts of concentrated hydrochloric acid. Thereupon, at 0–5°, the diazo solution is added dropwise, after which the reaction mass is buffered with 40 parts of crystalline sodium acetate. Upon completion of the coupling which ensues, the formed dyestuff is filtered off, washed free of acid and dried. The dyestuff, which corresponds to the formula

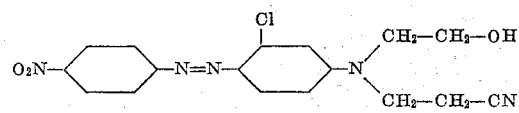

dyes acetate silk in pure orange shades of very good fastness to light and outstanding fastness to washing, gas fumes and sublimation. The shade on polyamide fibers is very slightly redder that that on acetate silk.

Similar dyestuffs are obtained when, while otherwise proceeding as aforedescribed in the present example, the 1 - (N - cyanoethyl - N - hydroxyethyl) - amino - 3-chlorobenzene is replaced by an equivalent quantity of 1 - (N - cyanoethyl - N - hydroxyethyl) - amino - 3-bromobenzene.

Example 2

17.5 parts of 4-nitro-2-chloro-1-aminobenzene are stirred into 120 parts of water and 42 parts of concentrated hydrochloric acid. After the addition of 120 parts of ice, diazotization is carried out with a solution of 7 parts of sodium nitrite and 25 parts of water. Then 23 parts of 1-(N-cyanoethyl-N-hydroxyethyl)-amino-3-chlorobenzene are stirred into 250 parts of water and 15 parts of concentrated hydrochloric acid. Thereupon, at 0–5°, the diazo solution is added dropwise. Stirring is continued until the ensuing coupling is complete, whereupon the formed dyestuff is filtered off, washed free of acid and dried. The dyestuff, which corresponds to the formula

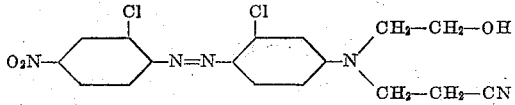

dyes acetate silk brick-red, and the dyeings are of very good fastness to light and outstanding fastness to washing, sublimation and gas fumes. The shade on polyamide fibers is somewhat bluer.

Similar dyestuffs are obtained when, while otherwise proceeding as aforedescribed in the present example, the 1 - (N - cyanoethyl - N - hydroxyethyl) - amino - 3-chlorobenzene is replaced by an equivalent quantity of 1 - (N - cyanoethyl - N - hydroxyethyl) - amino - 3-bromobenzene.

Example 3

21 parts of 4-nitro-2,6-dichloro-1-aminobenzene are introduced at 60–70° into 130 parts of concentrated sulfuric acid. Then, while stirring thoroughly, diazotization is carried out with 7 parts of sodium nitrite. In a short time, the reaction mass is allowed to cool to room temperature (about 20°). Then 23 parts of 1-(N-cyanoethyl-N-hydroxyethyl)-amino-3-chlorobenzene are stirred into 200 parts of water, 10 parts of concentrated hydrochloric acid and 700 parts of ice. The diazotization mixture is then added to the solution of the azo component in such manner that the temperature does not rise above 5°. Upon completion of the ensuing coupling, the formed monoazo dyestuff is filtered off, washed free of acid, and dried under reduced pressure. The dyestuff, which corresponds to the formula

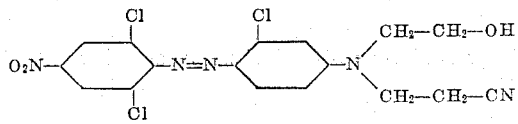

dyes acetate silk yellow-brown, the dyeings being characterized by outstanding fastness to light, washing, sublimation and gas fumes. The dyeings on polyamide fibers are red-brown.

Similar dyestuffs are obtained when, while otherwise proceeding as aforedescribed in the present example, the 4-nitro-2,6-dichloro-1-aminobenzene is on the one hand replaced by an equivalent quantity of 4-nitro-2,6-dibromo-1-aminobenzene or of 4-nitro-2-chloro-6-methyl-1-aminobenzene or of 4-nitro-2-bromo-6-methyl-1-aminobenzene and/or the 1-(N-cyanoethyl - N - hydroxyethyl)-amino-3-chlorobenzene is on the other hand replaced by an equivalent quantity of 1 - (N - cyanoethyl - N - hydroxyethyl)-amino-3-bromobenzene.

Thus-obtained dyestuffs which dye acetate silk in yellow-brown to red-brown tints of outstanding fastness to light, washing, sublimation and gas fumes, correspond for instance to the formulae

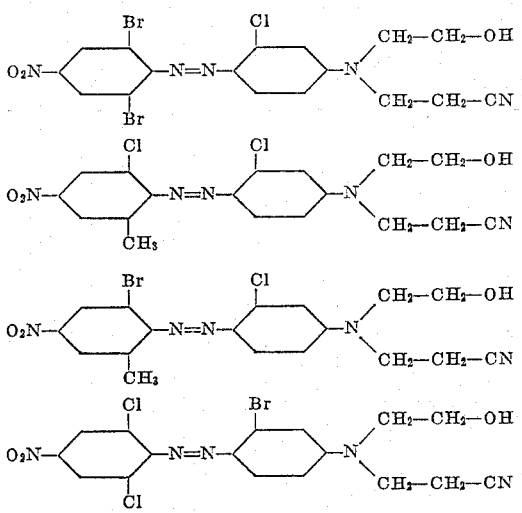

Example 4

22 parts of 4-nitro-2-bromo-1-aminobenzene are stirred into 30 parts of concentrated hydrochloric acid and 30 parts of water. After the addition of 100 parts of ice, diazotization is effected with 7 parts of sodium nitrite. Then the diazo compound in the diazotization mixture is coupled with 23 parts of 1-(N-cyanoethyl-N-hydroxyethyl)-amino-3-chlorobenzene, previously stirred into 250 parts of water, 10 parts of concentrated hydrochloric acid and 300 parts of ice. Upon completion of the ensuing dyestuff formation, the dyestuff is filtered off, washed free of acid, and dried. The thus-obtained dyestuff, corresponding to the formula

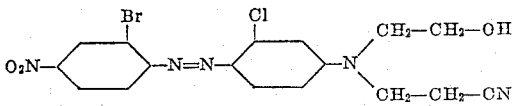

dyes acetate silk in brilliant scarlet shades of very good fastness to light and of outstanding fastness to washing, sublimation and gas fumes.

Example 5

21 parts of 4-nitro-2,5-dichloro-1-aminobenzene are introduced into 130 parts of concentrated sulfuric acid at 60–70°. Thereupon diazotization is carried out with 7 parts of sodium nitrite, while stirring thoroughly. In a short time the mass is allowed to cool to room temperature (about 20°). Then 23 parts of 1-(N-cyanoethyl-N-hydroxyethyl)-amino-3-chlorobenzene are stirred into 200 parts of water, 10 parts of concentrated hydrochloric acid and 700 parts of ice. The diazotization mass is then added to the solution of the azo component in such manner that the temperature does not rise above 5°. Upon completion of the resultant coupling, the obtained dyestuff which corresponds to the formula

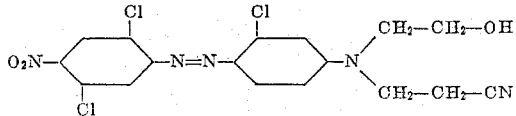

is filtered off, washed free of acid, and dried under reduced pressure. The dyestuff dyes acetate silk in bright scarlet shades and polyamide fibers in red shades.

Example 6

20.5 parts of 5-methoxy-4-nitro-2-chloro-1-aminobenzene are dissolved in 130 parts of concentrated sulfuric acid and diazotized at 60° with the aid of 7 parts of sodium nitrite. A mixture of 23 parts of 1-(N-cyanoethyl-N-hydroxyethyl)-amino-3-chlorobenzene, 10 parts of hydrochloric acid of 30% strength, 200 parts of water and 600 parts of ice is then prepared, and the previously prepared diazotization mixture is added thereto dropwise and while stirring. Coupling to form a monoazo dyestuff is accelerated by the addition of 200 parts of crystalline sodium acetate to the reaction mass. After working up in the manner of the previous examples, there is obtained a dyestuff which dyes acetate silk in red-orange shades and polyamide fibers in bright scarlet shades.

Example 7

0.6 part of the dyestuff of Example 3 (first paragraph) is dispersed with the aid of Turkey red oil, and the dispersion used for dyeing 100 parts of acetate silk in a soap bath in conventional manner, preferably at elevated temperature. The material is dyed yellow-brown and has excellent fastness properties. To improve dispersion, the dyestuff may be ground prior to carrying out the dyeing process proper, with a suitable wetting agent, dispersing agent or emulsifier, preferably in the presence of an inorganic salt such for example as Glauber salt.

Example 8

10 parts of a 20% aqueous paste of the dyestuff according to Example 4 is intimately admixed with 10 parts of diethylene-glycol and 80 parts of gum arabic thickener. The resulting printing paste yields, after steaming, scarlet prints of excellent fastness properties on acetate silk and on polyamide fibers.

Having thus disclosed the invention what is claimed is:

1. A monoazo dyestuff which corresponds to the formula

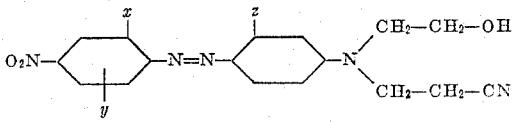

wherein $x$ stands for a member selected from the group consisting of H, Cl and Br, $y$ stands for a member selected from the group consisting of H, Cl, Br, methyl and methoxy, and $z$ stands for a member selected from the group consisting of Cl and Br.

2. The monoazo dyestuff which corresponds to the formula

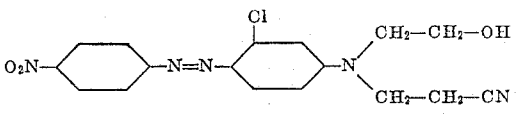

3. The monoazo dyestuff which corresponds to the formula
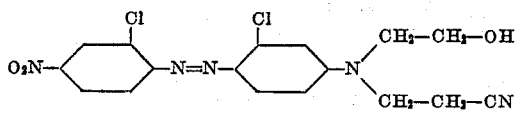
4. The monoazo dyestuff which corresponds to the formula
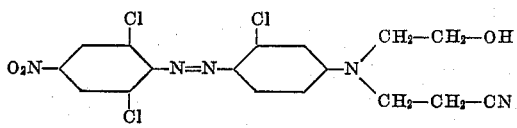
5. The monoazo dyestuff which corresponds to the formula
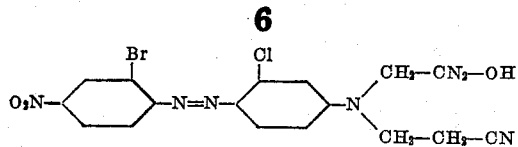
References Cited in the file of this patent
UNITED STATES PATENTS
| | | |
|---|---|---|
| 2,082,156 | Felix et al. | June 1, 1937 |
| 2,118,661 | Baumann | May 24, 1938 |
| 2,151,857 | Manz et al. | Mar. 28, 1939 |
| 2,492,971 | Dickey | Jan. 3, 1950 |
| 2,615,013 | Dickey | Oct. 21, 1952 |
| 2,649,440 | Dickey et al. | Aug. 18, 1953 |